United States Patent [19]

Temple

[11] 4,009,555

[45] Mar. 1, 1977

[54] HEIGHT CONTROL FOR COMBINE HEADERS

[75] Inventor: William F. Temple, Northville, Mich.

[73] Assignee: Massey-Ferguson Inc., Detroit, Mich.

[22] Filed: Feb. 26, 1976

[21] Appl. No.: 661,671

[52] U.S. Cl. .................................. 56/10.2; 56/208; 56/DIG. 15
[51] Int. Cl.² ........................................ A01D 47/00
[58] Field of Search .................. 56/10.2, 10.4, 208, 56/DIG. 15

[56] References Cited

UNITED STATES PATENTS 3,851,451  12/1974  Agness et al. .................... 56/10.2

Primary Examiner—J.N. Eskovitz
Attorney, Agent, or Firm—Robert L. Farris

[57] ABSTRACT

An automatic height control for the header of a combine in which the elevation of the header relative to the ground is varied by hydraulic means under the control of the system using the presence or absence of light to lower or raise the header, the light being regulated by feeler members engageable with the ground and being responsive to changes in ground contour.

11 Claims, 5 Drawing Figures

HEIGHT CONTROL FOR COMBINE HEADERS

This invention relates to self propelled agricultural machines and more particularly to the control of the ground clearance height of a harvesting table or header on such a machine.

During the harvesting of many crops, it is necessary to maintain the cutting head and harvesting table of the header as close to the ground as possible and still maintain a sufficient spacing above the ground to avoid picking up soil and stones or the like and damaging the cutting head and table. Manual adjustment of the height of the header by the operator is not effective, and it becomes necessary to provide means for automatically making adjustments in the header height to accommodate changes in contour of the ground.

Prior arrangements for automatically controlling the raising and lowering of the header employ mechanical arrangements disposed transversely of the harvesting machine which move in response to ground contour and transmit motion through mechanical linkage to control hydraulic devices for raising and lowering the relatively heavy header. Such arrangements add complexity and weight to the already heavy header and introduce lost motion which is detrimental to accurate and rapid control.

It is an object of the invention to automatically control the ground clearance height of a header on a harvesting machine by an arrangement in which changes in height of the header are sensed and transmitted by means of light to a control arrangement for raising and lowering the header.

It is another object of the invention to provide a height control arrangement for the header on an agricultural harvesting machine in which variations in ground contour relative to a transversely extending header are signaled through light conveying means to a control system which raises or lowers the header.

An automatic height control system for the header on a harvesting machine has been provided in which the means for raising and lowering the header is actuated in response to a sensitive arrangement disposed at one side of the header which has a source of signaling light at the other side of the header. The source of light and the light sensitive means are connected together by light transmitting means in the form of fiber optics and ground engaging feeler members serve to interrupt the transmission of light between the light source and the light sensitive means to raise the header to an elevated position above the ground after which light transmission between the light source and the light sensitive means can be reestablished to cause the header to be lowered to its original operating position relative to the ground.

Figure 1:
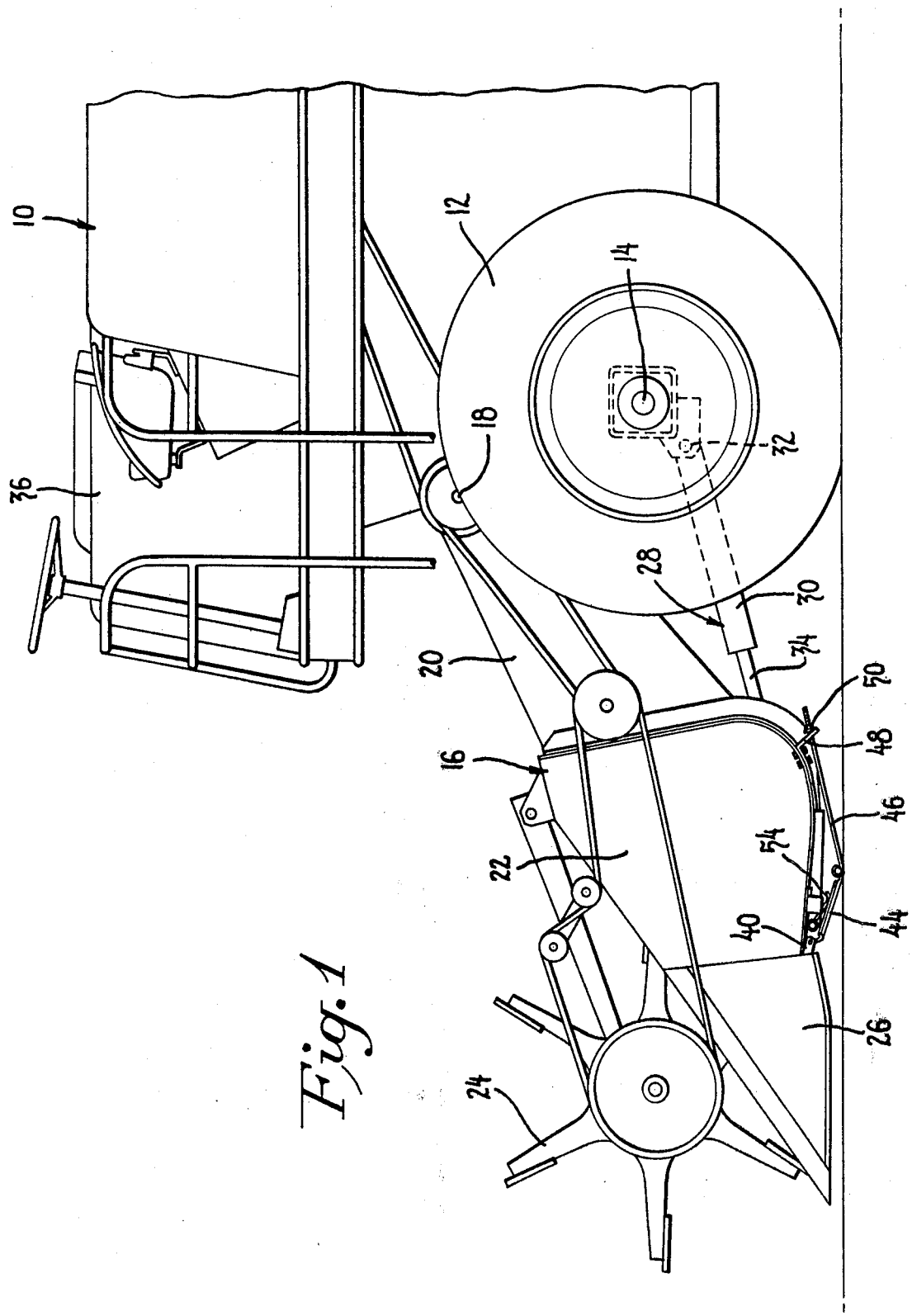
FIG. 1 is a partial elevational view of a harvesting machine having an automatic header height control embodying the invention.

As seen in FIG. 1, a combine harvester 10 has front wheels 12 mounted on an axle 14. A header 16 is supported on the forward end of the combine harvester for vertical pivotal movement about a transverse horizontal axis indicated at 18. The header 16 includes an elevator 20, a table 22, a rotating reel 24 and forwardly projecting shields 26 at the ends of the header. The header 16 is raised and lowered about the axis of the shaft 18 by hydraulic actuator 28 having a cylinder portion 30 pivoted adjacent to the axle 14 as indicated at 32 and has an extensible and retractable piston rod 34 pivotally connected to the table 22.

Operation of the hydraulic actuator 28 is under the control of the usual hydraulic system and manually operated controls (not shown) which are available to an operator at the control station 36 of the combine harvester 10.

Figure 2:
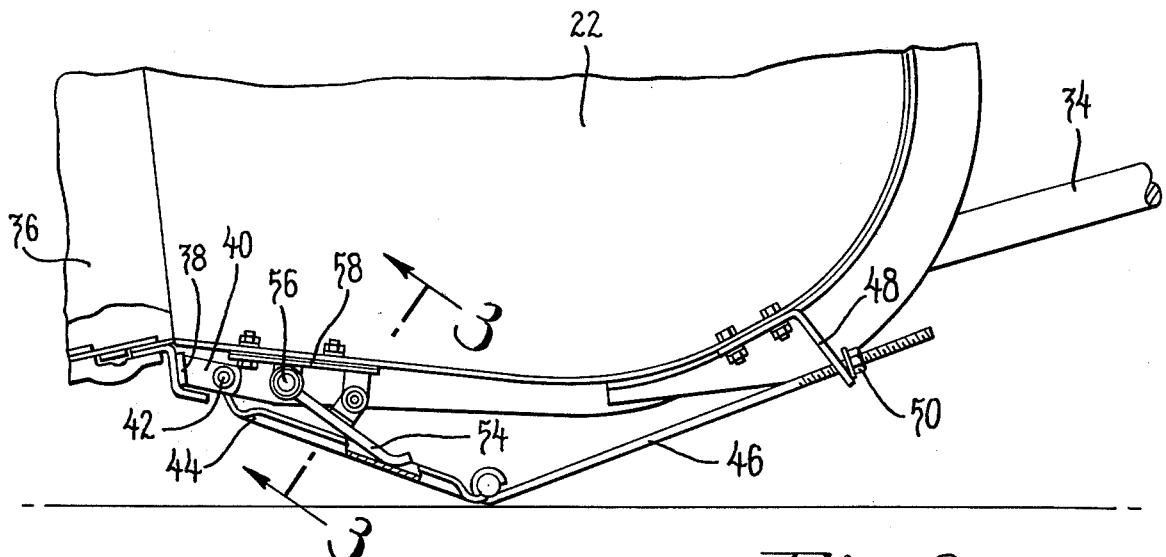
FIG. 2 is an enlarged view of a portion of the header shown in FIG. 1.

Referring to FIG. 2, the table 22 is provided with a transversely extending support bar 38 at its forward lower side. Projecting rearwardly from the support bar 38 are a plurality of support brackets 40, only one of which is shown, but which are arranged in pairs with each pair supporting a pivot pin 42. Pivotally supported on each pivot pin 42 is a feeler member 44 which extends generally rearwardly and downwardly at a slight angle from the table 22. A plurality of such feeler members 44 are uniformly spaced transversely of the table 22 as seen in FIG. 3 and each of the feeler members 44 is independently movable about the axis of the pivot pins 42.

The rear end of each of the feeler members 44 pivotally supports a guide rod 46, the rear end of which is slidably supported in a bracket 48 secured to the underside of the table 22. The guide rod 46 is provided with a nut 50 threadably engaged on the guide rod 46 to engage the bracket 48 to act as a stop for limiting the forward sliding movement of the guide rod 46 and also serves to limit downward pivotal movement of the feeler members 44. The guide rods 46 also serve to hold the feeler members against becoming embedded in the soil upon movement of the combine harvester 10 in a reverse direction.

Figure 3:
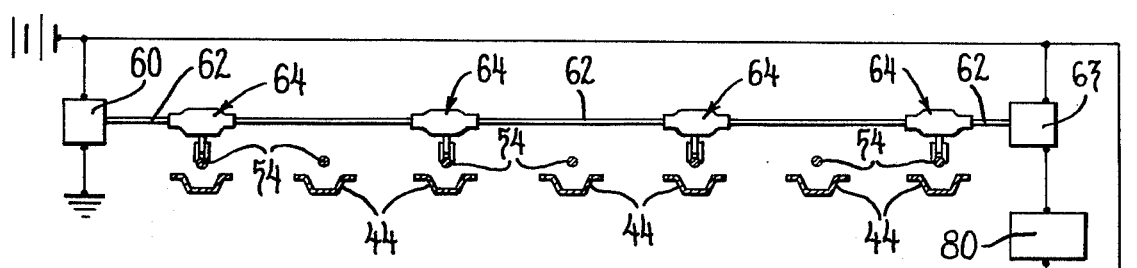
FIG. 3 is a partial sectional view of the automatic control arrangement taken on line 3 — 3 in FIG. 2 and schematically showing the electrical and hydraulic system.

As seen in FIG. 3, the feeler members 44 are generally channel shaped and as seen in FIG. 2, the channel portion receives one end of an actuating element 54. The other end of the actuating element 54 is fastened to a shaft 56 supported for rotation by a bracket 58 fastened to the underside of the table 22. The adjacent actuating element 54 associated with one of the adjacent feeler members 44 also is fastened to the shaft 56 so that pairs of actuating elements 54 swing with the shaft 56 as a unit upon movement of either one of the pair of associated feeler members 44.

The feeler members 44 and the actuating elements 54 make up a height sensing assembly which responds to changes in contour of the ground over which the combine harvester 10 travels.

Referring now to FIG. 3, the control system for regulating the raising and lowering of the table 22 includes a light source 60 mounted on the header 16 at one side of the harvester which transmits light by way of light transmitting members in the form of fiber optic elements 62 to a light sensitive member such as a photo cell 63.

The fiber optic elements 62 function to transmit light from one point to another from one end of each fiber optic element 62 to the other just as copper wire transmits electrical energy, consequently the elements may flex and it is not necessary to maintain them in a straight line in order for light to be transmitted from one end to the other.

Figure 4:
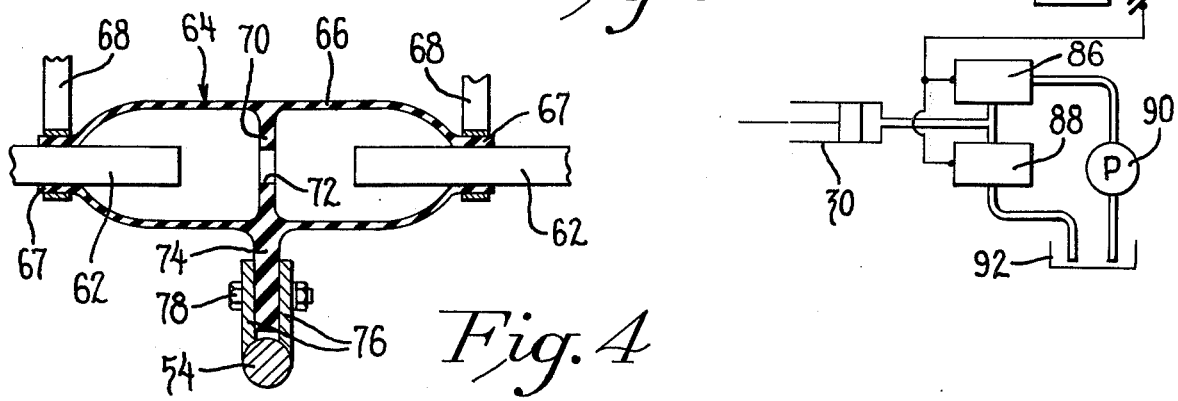
FIG. 4 is a view at an enlarged scale of a portion of the control arrangement seen in FIG. 3.

The fiber optic elements 62 are spaced apart transversely of the header and more specifically, generally transversely and above the actuating rods 54. The ends of the fiber optic assemblies 62 are held in spaced apart relationship by shutter assemblies 64. As best seen in FIG. 4, each shutter assembly 64 includes a generally tubular housing 66 made of resilient material such as rubber or the like. Opposite ends of the housing 66 are reduced in size to form collars 67 which may be pressed onto the ends of the fiber optic assembly 62 so that the ends of the fiber optic assemblies are disposed within the housing 66 in spaced apart relationship and in general axial alignment with each other. The collars 67 are gripped by bracket members 68 fastened to the underside of the table 22 which serves to support the shutter assemblies 64 as well as the fiber optic elements 62.

The interior of the housing 66 is divided by a central wall 70 which is provided with a central aperture 72 in alignment with the ends of the fiber optic assemblies 62. The exterior of the housing 66 is provided with a depending flange 74 which is held between tongs 76 forming part of the actuating rod 54 by means of a bolt 78.

Referring to FIG. 4, light transmitted from the light source passes through the adjacent fiber optic assembly 62 to the housing 66 and through the aperture 72 to the end of another fiber optic assembly 62. In this manner, light from the light source 60 can be transmitted through a series of fiber optic assemblies 62 and shutter assemblies 64 to the photo cell 63.

Referring again to FIG. 4, movement of the actuating rod 54 upwardly serves to deform the resilient housing member 66 so that the wall 70 also moves upwardly. Such movement of the wall 70 moves the aperture 72 out of alignment with the spaced ends of the fiber optic assembly 62 so that the transmission of light is interrupted between the two optic assemblies. As previously pointed out, movement of any one of the feeler members 44 upwardly or in a counterclockwise direction as seen in FIG. 2, serves also to move a pair of actuating elements 54 which are connected together and one of which engages a feeler member 44. Only one shutter assembly 64 is required for each pair of actuating elements 54 so that movement of either feeler member 44 of the associated pair of feeler members is transmitted to shutter assembly 64 to interrupt the transmission of light between the light source 60 and the photo cell 63.

The interruption of light to the photo cell 63 and its reestablishment is employed in a control arrangement best understood by reference to FIG. 3. The hydraulic actuator 30 can be of the one-way type under the control of a pair of solenoid valves 86 and 88 connected in a hydraulic circuit including a pump 90. In normal operations the hydraulic cylinder 30 is retracted and the valve 86 is closed and the valve 88 is opened permitting hydraulic fluid to drain to a reservoir 92. In the presence of light at the photo cell 63, a relay 94 serves to maintain the circuit to the relay operated valves 86 and 88 open so that the hydraulic actuator 30 remains in its retracted position. However, in the absence of light at the photo cell 63, the amplifier 80 energizes the relay 94 which serves to simultaneously open the valve 86 and close the valve 88 so that hydraulic fluid from the pump 90 extends the hydraulic actuator 30. Extension of the hydraulic actuator 30 raises the header 16.

When the header 16 is in an elevated position all of the height sensing assemblies will be at their lower most position relative to the table 22 which in turn insures that all of the shutter assemblies 64 will be open to permit the transmission of light. Upon reestablishment of light at the photo cell, the relay 94 is deenergized so that the valve 86 closes and the solenoid valve 88 opens permitting the weight of the header 16 to retract the rod 34 into the cylinder 40 and force hydraulic fluid from the actuator 30 to the reservoir 92 so that the header 16 returns to its original position relative to the ground.

The original or lowered position of the header 16 relative to the ground may be adjustably controlled by various means, obvious to one skilled in the art, which are not shown. For example, a valve could be placed in the line between the valve 88 and the sump 92. This valve could be closed when the actuator 30 is in a predetermined lowered position. The lowered position of the header 16 could also be controlled by arranging a ground sensing system similar to the system described above, except that the passage of light would be blocked when the table is in any raised position above a predetermined position. The lowered position could also be determined by a stop which limits downward movement of the table 22.

During operation of the combine during harvesting and movement of the combine, the feeler members 44 engage the ground and under normal operating conditions light will be transmitted from the light source 60 to the photo cell 63 to maintain the controls so that the header 16 remains in a normal operating position. If, however, any one of the feeler members 44 encounters an obstacle, such as a rock or a mound in the soil, it will be raised upwardly to move the associated pair of actuating rods 54 one of which will be connected to a shutter assembly 64. Movement of the actuating rods 54 serves to close the shutter assembly 64 and interrupt the transmission of light to the photo cell 63 causing energization of the solenoid valve 88 and raising of the header 16. After the obstruction is passed, the feeler member 44 will swing downwardly relative to the elevated header and return to its original position permitting the actuating rods 54 to swing downwardly to realign the aperture 72 in the shutter assembly 64 with the ends of the associated fiber optic assembly 62 so that light is again transmitted to the photo cell 63. Reestablishing light at the photo cell 63 is used to energize circuits in the amplifier 80 to control the relay 94 so that valve 86 is closed to the delivery of hydraulic fluid and simultaneously valve 88 opens permitting hydraulic fluid to escape from the hydraulic actuator 30 and the header 16 returns toward its original position relative to the ground.

Figure 5:
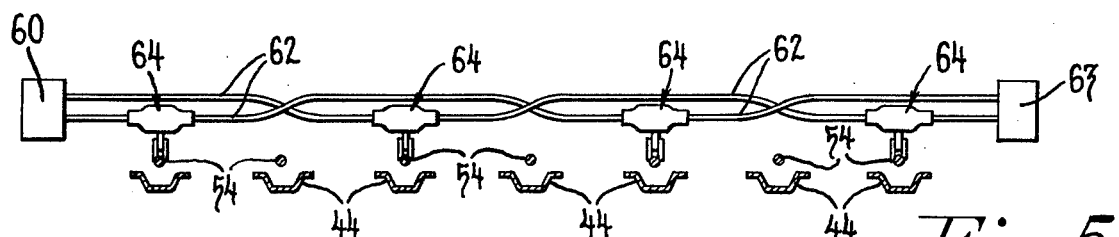
FIG. 5 shows a modification of the control arrangement as seen in FIG. 3.

In the arrangement seen in FIG. 3, the fiber optic assembly 62 and the shutter assembly 64 are connected together in series between the light source 60 and the photo cell 63. However, some header assemblies have a large transverse dimension and it has been found that each of the shutter assemblies 64 reduces the efficiency of light transmission. To avoid any problems that may become associated with connecting too many fiber optic assemblies 62 and shutter assemblies 64 in series, the arrangement shown in FIG. 5 is employed in which two series paths of fiber optics and shutter assemblies are shown. It will be understood that more than two such paths can be provided depending on the transverse length of the header assembly.

An automatic height control for the header of an agricultural combine has been provided in which light is transmitted from one side of the header to the other and the presence or absence of such light is employed to operate a hydraulic system raising or lowering the header. The light is transmitted by fiber optic elements which transmit the light for the length of the fiber optic element between a light source and a light sensitive photo cell so that interruption of the transmission of light in the fiber optic elements serves to electrically actuate the hydraulic system to change the elevation of the header. The interruption of the transmission of light in the fiber optic elements is accomplished by an assembly including ground engaging feeler members which actuate shutter means to interrupt light and signal the hydraulic system to raise the header relative to an obstruction in the ground until such an obstruction is passed.

The embodiments of the invention which an exclusive property or privilege is claimed are defined as follows:

1. A harvesting machine having a harvesting header operated by power means, control means for regulating said power means for moving said header between predetermined operating position relative to the ground and an elevated position, sensing means for sensing the elevation of said header relative to the ground, a source of light, light sensitive means responsive to the presence and absence of light from said source and being operatively connected to said control means to move said header relative to the ground between its said operating positions, and actuating means operatively connected with said sensing means to interrupt and reestablish communication of light from said source of light to said light sensitive means upon changes of elevation of said header.

2. The combination of claim 1 in which said sensing means includes a plurality of spaced sensing assemblies mounted on said header for engagement with the ground and for vertical movement relative to each other and to said header upon encountering an obstruction.

3. The combination of claim 1 in which said actuating means include a plurality of shutter assemblies associated, respectively, with said sensing assemblies, said shutter assemblies being movable between open and closed position and being disposed between said source of light and said light sensing means and being operative to permit or to interrupt the transmission of light from said source of light to said light sensitive means for varying the elevation of said header relative to the ground.

4. The combination of claim 3 in which said shutter assemblies are operative to close and interrupt light from said source of light to said light sensitive means upon vertical movement of said height sensing assembly relative to said header upon encountering an obstruction.

5. The combination of claim 1 and further comprising light conducting means disposed between said source of light and said actuating means and between the latter and said light sensitive means.

6. The combination of claim 5 in which said light conducting means are elongated fiber optic elements.

7. The combination of claim 6 in which said shutter assemblies each receive adjoining ends of said fiber optic elements and maintains them in spaced apart relationship, and a wall member disposed between the ends of said fiber optic elements, said wall member having an opening in alignment with the ends of said fiber optic elements when said height sensing means is in a normal position relative to said header and being movable out of alignment with said ends of said fiber optic elements when said height sensing means encounter obstructions.

8. The combination of claim 1 in which said source of light is disposed at one side of said header and said light sensitive means is disposed at the other side of said header.

9. The combination of claim 1 in which said sensing means includes a plurality of ground engaging feeler members mounted on said header for vertical movement relative thereto independently of each other encountering obstructions, said actuating means including a plurality of shutter assemblies each operatively connected to one of said feeler members for movement between open and closed positions, and light conducting means between said source of light and each of said shutter means and between the latter and said light sensitive means.

10. The combination of claim 9 in which said light source, shutter assemblies and light sensitive means are connected in series by said light conducting means.

11. The combination of claim 9 in which said feeler members are connected together in pairs so that movement of one feeler member of said pair results in corresponding movement of the other of said feeler members and in which a shutter assembly is connected to one of said pair of feeler members.

* * * * *